United States Patent
Kang et al.

(10) Patent No.: US 7,178,493 B2
(45) Date of Patent: Feb. 20, 2007

(54) METHOD AND SYSTEM TO AVOID PISTON-VALVE COLLISION

(75) Inventors: Jun-Mo Kang, Ann Arbor, MI (US); Chen-Fang Chang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 41 days.

(21) Appl. No.: 11/177,832

(22) Filed: Jul. 8, 2005

(65) Prior Publication Data

US 2007/0006832 A1    Jan. 11, 2007

(51) Int. Cl.
*F01L 1/34* (2006.01)

(52) U.S. Cl. ............................ 123/90.15; 123/90.16; 123/90.1; 701/101; 701/102; 701/105

(58) Field of Classification Search ............. 123/90.15
See application file for complete search history.

(56) References Cited

U.S. PATENT DOCUMENTS 6,230,675 B1 *  5/2001  Kobayashi et al. ...... 123/90.15
6,575,128 B2 *  6/2003  Nakamura et al. ....... 123/90.16
6,938,593 B2 *  9/2005  Magner et al. .......... 123/90.16
6,994,061 B2 *  2/2006  Magner et al. .......... 123/90.15
2004/0261736 A1 * 12/2004  Babbitt et al. ........... 123/90.13
2006/0027196 A1 *  2/2006  Shimojo et al. ......... 123/90.17

* cited by examiner

*Primary Examiner*—Thomas Denion
*Assistant Examiner*—Kyle M. Riddle
(74) *Attorney, Agent, or Firm*—Kathryn A. Marra

(57) ABSTRACT

A method and system to avoid collision of piston and engine valves is provided. This facilitates use of a fully flexible variable valve actuation system over its operating range, without arbitrary constraints. Included is actuation control of the engine valve, determination of a crank angle at which to initiate engine valve opening, and determination of a desired valve lift, and, duration of valve open time. Opening profile for the engine valve is estimated. A first and a second crank angle are calculated, based upon the estimated opening profile. The crank angle to initiate engine valve opening is determined by adding a safety margin to the second crank angle. The method determines a maximum valve lift, given the duration of valve open time and an engine valve opening crank angle, and a minimum duration of valve open time, given a valve lift and an engine valve opening crank angle.

23 Claims, 6 Drawing Sheets

METHOD AND SYSTEM TO AVOID PISTON-VALVE COLLISION

TECHNICAL FIELD

This invention pertains generally to internal combustion engine control systems, and more specifically to avoidance of piston-valve collisions, especially in engines equipped with variable valve actuation systems.

BACKGROUND OF THE INVENTION

Designers of internal combustion engines implement various technologies and control strategies to improve performance parameters, including reducing exhaust emissions, increasing engine power, and improving fuel economy. A technology presenting opportunities for such improvements is in the area of improved valvetrain control, which seeks to improve performance by improving engine breathing and reducing pumping losses, thus improving volumetric efficiency. Improvements in engine performance through use of valvetrain control strategies benefit conventional spark-ignition engines, compression-ignition engines, and engines that employ intermediate engine strategies, such as homogeneous-charge compression-ignition engines.

Valvetrain control strategies can include control of magnitude of valve lift or valve opening, duration of valve opening, and timing of valve opening, and encompass intake valves and/or exhaust valves. A variable cam phasing system typically alters timing of intake valve opening relative to crankshaft position by employing an oil pressure-actuated phasing device that alters only timing of intake or exhaust valve opening without effecting magnitude of valve lift or valve opening duration. A variable lift control system typically alters magnitude and duration of valve opening by employing a two-step cam shaft, wherein each step of the camshaft is selectable. A fully flexible valve actuation system provides variable cam phasing and variable lift control to permit control of valve opening duration, valve lift, and valve timing.

On an engine system employing a valve actuation system, there is a risk of collision between engine valves and pistons. Piston/valve collisions result in unwanted noise and risk of damage to engine components, leading to warranty and costly repairs. Engine designers generally have avoided piston/valve collisions by restricting range of operation of the valve control devices. However, restricting range of operation of a valve control device reduces the ability of the engine designer to optimize engine performance over its range of operation.

Therefore, what is needed is a method and system which permits operation of a variable valve actuation system over its available range operation, while eliminating risk of harm to the engine due to collision between engine valves and pistons. Such a system and method enables a more aggressive valve control strategy to maximize engine performance in various powertrain applications.

SUMMARY OF THE INVENTION

The present invention comprises an improvement over conventional engine controls by providing a method and system to avoid a collision of piston and engine valves. This facilitates use of a fully flexible variable valve actuation system over its operating range, without imposition of arbitrary constraints typical of variable valve actuation systems, thus allowing optimization of engine operation.

In accordance with the present invention, a method and system are described to control actuation of an engine valve operable to control combustion chamber flow. The combustion chamber is formed in a cylinder having a reciprocating piston operably attached to a crankshaft. The method includes determining a crank angle at which to initiate engine valve opening. A desired valve lift, and, a duration of valve open time are determined. An opening profile for the engine valve is estimated, based upon the desired valve lift, and, the duration of valve open time. A first crank angle is calculated, based upon the estimated opening profile for the engine valve, a cylinder diameter, and, a cylinder displacement. A second crank angle is determined, based upon the first crank angle, a linear position of the piston determined when the crankshaft is at the first crank angle, and, the estimated opening profile for the engine valve. The crank angle at which to initiate engine valve opening is determined by adding a safety margin to the second crank angle.

Another aspect of the invention comprises estimating position of the valve over a range from closed position to fully open position as a linear equation with a fixed-slope over the range from the closed position to the fully open position.

Another aspect of the invention comprises determining a difference between the estimated valve opening profile and actual valve opening profile to offset the second crank angle by the safety margin.

Another aspect of the invention comprises determining the difference between the estimated valve opening profile and actual valve opening profile, based upon engine operation, and, valve actuation mechanization.

Another aspect of the invention comprises controlling a position of a variable cam phasing device, based upon the determined crank angle at which to initiate engine valve opening.

Another aspect of the invention comprises executing the method to regularly determine crank angle at which to initiate engine valve opening at least once per engine cycle.

Another aspect of the invention comprises executing the method to regularly determine crank angle at which to initiate engine valve opening at least once per valve event.

Another aspect of the invention comprises the valve actuation system being a variable valve lift control system.

Another aspect of the invention comprises the valve actuation system being a multiple step valve lift system.

Another aspect of the invention comprises the valve actuation system being an individually actuated valve control system.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE INVENTION

Figure 1:
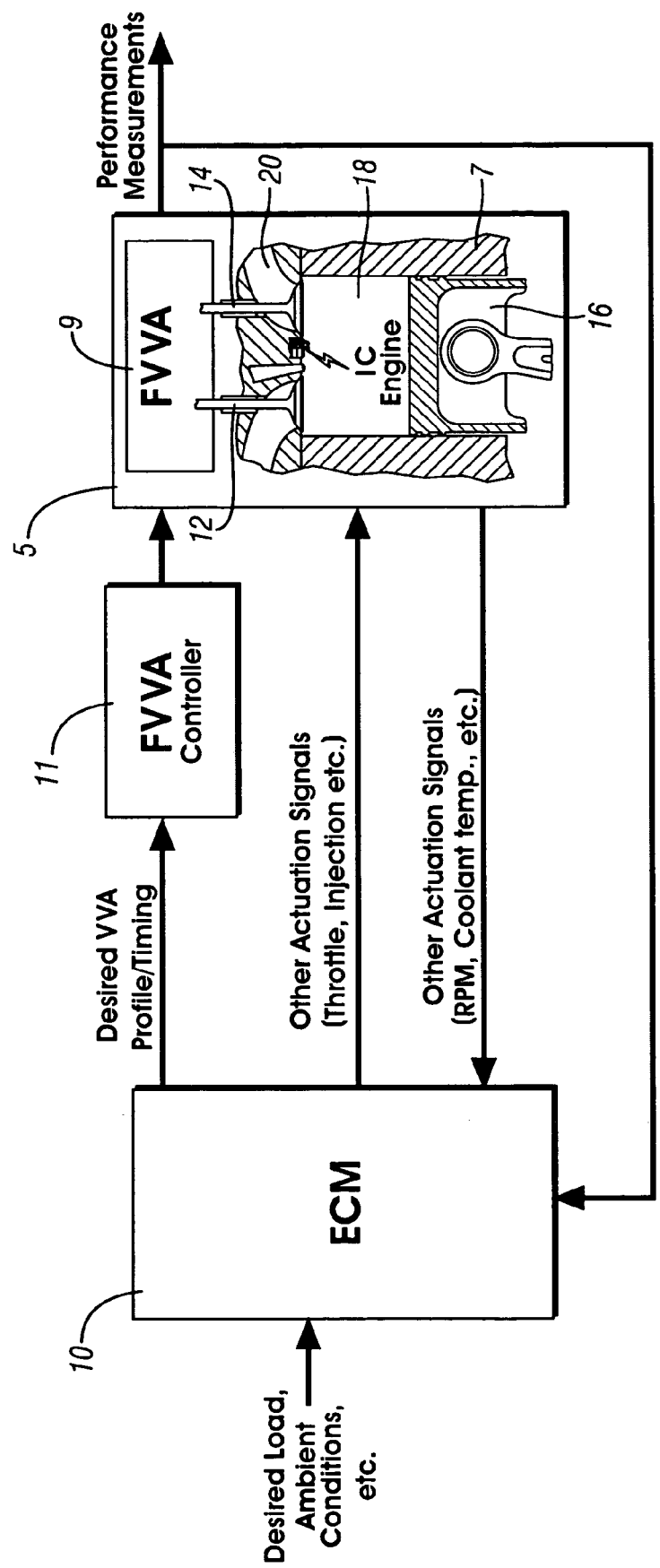
FIG. 1 is a schematic diagram of an exemplary engine, in accordance with the present invention.

Referring now to the drawings, wherein the showings are for the purpose of illustrating embodiments of the invention only and not for the purpose of limiting the same, FIG. 1 shows a schematic of a device and control scheme of the present invention. The exemplary method and system is executed on a spark-ignition internal combustion engine 5 having one or more cylinders 7. In this embodiment, the device comprises a fully flexible variable valve actuation system ('FVVA'), comprising a controller 11 and actuator 9 operable to control opening and closing of intake valves 12 and exhaust valves 14 of internal combustion engine 5. The internal combustion engine 5 is coupled with an engine controller 10 operable to execute engine control schemes, based upon operator inputs and other factors. The FVVA controller 11 is operable to accept inputs from the engine controller 10 and control the FVVA actuator 9, in accordance with the control schemes described hereinbelow. The internal combustion engine preferably comprises a multi-cylinder engine, comprising an engine block, a head, and a crankshaft. A plurality of cylinders 7 is formed in the block, each cylinder containing a piston 16 operable to move linearly therewithin. Each piston 16 is mechanically operably connected to the crankshaft via a piston rod (not shown). The crankshaft is mounted on main bearings (not shown). A combustion chamber 18 is formed in each cylinder 7 between the top of each piston 16 and the cylinder head 20. The crankshaft rotates at main bearings, in response to linear force applied thereto by the piston rods, as a result of combustion events in each combustion chamber. The head 20 contains one or more intake valves 12 and one or more exhaust valves 14. The intake valves 12 are operable to open and allow inflow of air and fuel to the combustion chamber 18. The exhaust valves 14 are operable to open and allow exhaust of products of combustion out of the combustion chamber 18. There is a crank sensor located substantially near the crankshaft, operable to measure crank angular position, and such information is useable to measure crankshaft speed.

The FVVA system preferably comprises the FVVA controller 11 and actuator 9 operably attached to the intake valves 12 and exhaust valves 14 of the engine. The FVVA system is operable to control magnitude of valve lift, L, duration of valve opening, D, and timing of valve opening, $\theta$, of the intake valves 12 and exhaust valves 14, in response to input from the controller 10, according to control schemes. The engine controller 10 is preferably operable to monitor input from various engine sensors and operator inputs, and actuate various control devices in response thereto, using on-board control schemes in the form of algorithms, and calibrations. Specifically, the controller 10 monitors engine operation, operator inputs, and ambient conditions, and determines optimal valve opening profiles, in terms of magnitude of valve lift, L, duration of valve opening, D, and timing of valve opening, $\theta$, relative to crankshaft angular position. This information is communicated to the FVVA controller 11 via a communications bus (not shown).

The controller 10 is preferably an electronic control module comprised of a central processing unit signally electrically connected to volatile and non-volatile memory devices via data buses. The controller 10 is operably attached to other sensing devices and output devices to monitor and control engine operation. The output devices preferably include subsystems necessary for proper control and operation of the engine 5, including, by way of example, a fuel-injection system, a spark-ignition system (when a spark-ignition engine is used), an exhaust gas recirculation system, and an evaporative control system. The engine sensing devices include devices operable to monitor engine operation, external conditions, and operator demand, and are typically signally attached to the controller 10. Control algorithms are typically executed during preset loop cycles such that each control algorithm is executed at least once each loop cycle. Loop cycles are executed each 3, 6, 15, 25 and 100 milliseconds for typical engine operation. Use of the controller 10 to control the operation of the internal combustion engine 5 is well known to one skilled in the art.

Figure 2:
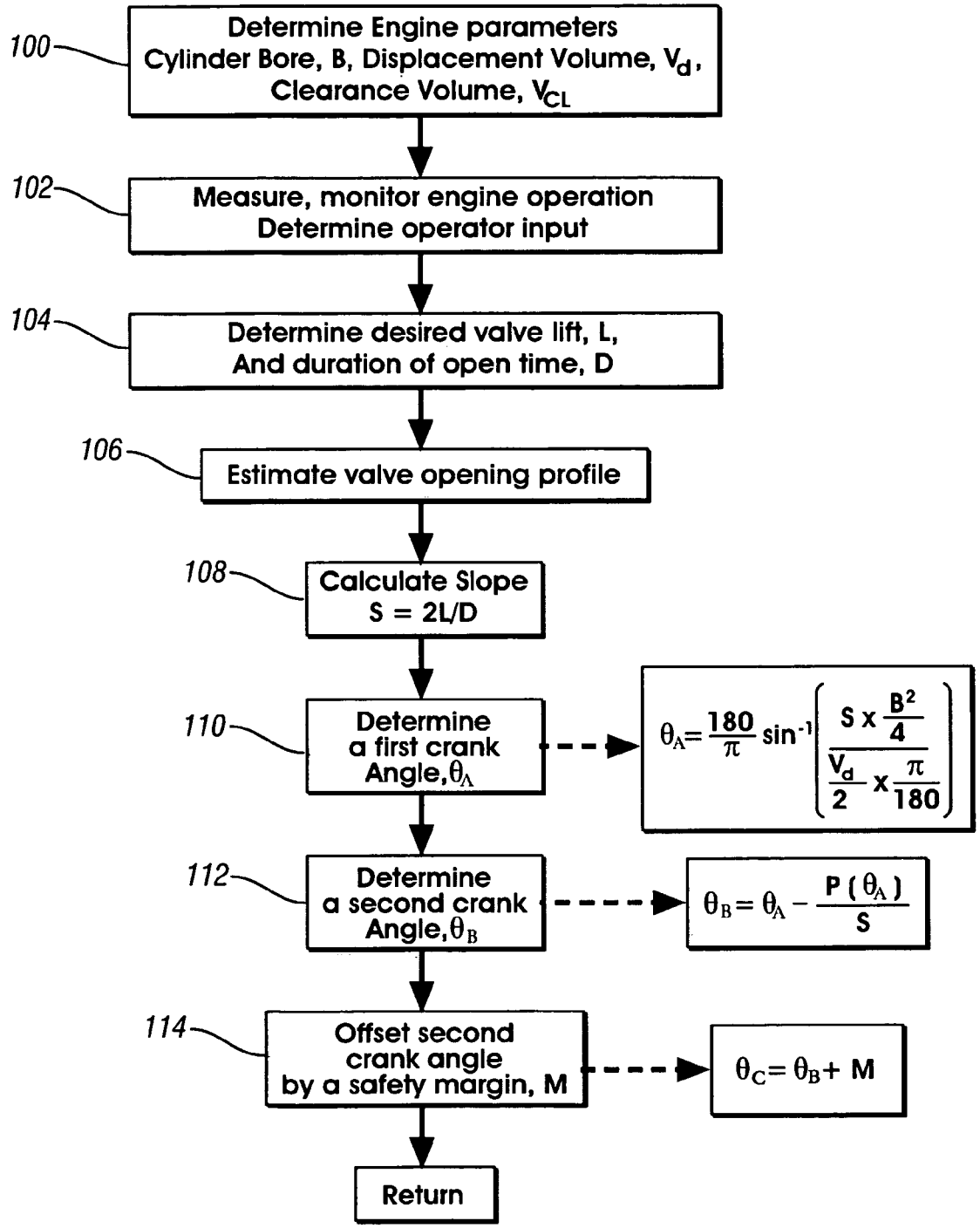
FIG. 2 is an algorithmic flowchart, in accordance with the present invention.
Figure 3:
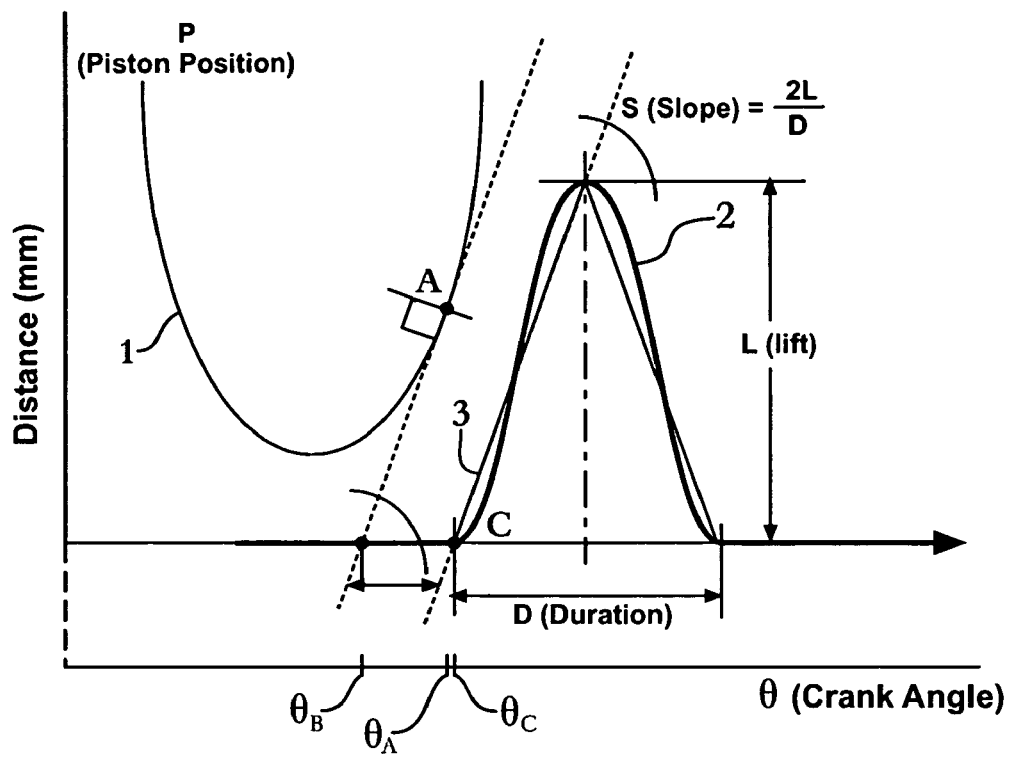
FIG. 3 is a graphical data representation, in accordance with the present invention.

Referring now to FIGS. 2 and 3, a method to control actuation and opening of the engine valves operable to control combustion chamber flow is shown. The method is preferably executed as one or more algorithms in the controller 10. The algorithm is preferably executed once per engine cycle to determine an earliest crank angle, denoted as $\theta_C$, at which to begin opening one of the intake valves 12 in order to prevent piston/valve interference. All crank angles are herein referred to by the Greek letter $\theta$ (theta). The algorithm may instead be executed once per engine cycle to determine a latest crank angle, denoted as $\theta_C$, at which each of the exhaust valves 14 must be closed in order to prevent piston/valve interference. Alternatively, the algorithm may be executed once per engine valve event, when the specific control scheme so demands. Examples of systems wherein the algorithm is executed each engine valve event include systems wherein an engine valve is opened twice during a single engine cycle, and engine systems using different valve profiles or valve timing for different cylinders. Included in calibration values associated with the algorithm are engine parameters, including cylinder bore B, stroke, displacement volume, $V_d$, and clearance volume, $V_{CL}$; intake and exhaust engine valve dimensions, including travel and related flow; camshaft profiles and associated engine valve travel; and other calibrated values necessary to provide an operating system for the engine.

Referring to FIG. 2, the algorithm preferably includes pre-calibrated information regarding engine design, including cylinder bore diameter, B (measured in millimeters), and cylinder volumetric displacement, $V_d$ (measured in cubic millimeters, $mm^3$), and, clearance volume, $V_{CL}$ (measured in cubic millimeters, $mm^3$) (Block 100). The controller is operable to determine engine operating conditions and operator inputs including demand for power (Block 102). Desired valve lift, L, and duration, D, of valve open time are determined for the next engine cycle, based upon engine operating and control parameters, including operator demand for airflow, scheduled exhaust gas recirculation fraction, evaporative canister purge rate, and other factors influencing the engine air/fuel ratio (Block 104). A skilled practitioner is able to determine appropriate levels for valve lift and duration based upon engine operation and control parameters, as part of engine development and calibration, prior to ongoing operation of the engine. Valve lift L is preferably expressed in dimensions of length, in millimeters. Duration D of valve open-time is preferably expressed in dimensions of angular rotation, $\theta$, of the crankshaft.

Referring now to FIG. 3, for an intake valve opening event, a first line, 1, showing linear movement of piston 16 and a second line, 2, showing linear movement of engine intake valve 12, both relative to crankshaft rotational angle θ, is shown.

The position of piston 16 at crank angle θ is calculated using the following equation:

$$p = \frac{\frac{V_d}{2}\left(1 - \cos\left(\frac{\pi}{180}\theta\right)\right) + V_{cl}}{\frac{\pi B^2}{4}} \quad [1]$$

wherein:
P=piston position,
B=cylinder bore (mm),
$V_d$=cylinder displacement, (mm$^3$),
$V_{cl}$=clearance volume, (mm$^3$), and,
θ=crankshaft angular rotation, (θ≅0° at the top dead center of exhaust stroke).

A valve opening profile is estimated based upon the desired valve lift and the duration of valve open time (block 106) and is shown as line 3 of FIG. 3. This preferably comprises estimating position of the valve employing a linear equation with a fixed-slope over a range from a closed engine valve position to a fully open engine valve position. Thus, the estimated profile with slope, S, is determined by approximating the desired valve profile, shown as line 3 of FIG. 3, using a triangle shape. Therefore, slope, S, is calculated as:

$$S = 2 \times L/D, \quad [2]$$

wherein:
L=Valve lift (mm), and,
D=Duration (crank angle degrees) (Block 108).

A first point, A, is determined by equating the slope of the tangent to the piston profile with slope, S.

$$\frac{dP}{d\theta} = \frac{\frac{V_d}{2}\left(\frac{\pi}{180}\sin\left(\frac{\pi}{180}\theta\right)\right)}{\frac{\pi B^2}{4}} = S \quad [3]$$

Point A comprises the point of first contact when a collision between the piston 16 and the valve 12 occurs, were the valve 12 to follow the estimated valve profile.

Solving Equation 1, the crank angle $\theta_A$ of the point A is:

$$\theta_A = \frac{180}{\pi} \times \sin^{-1}\left(\frac{S \times \frac{\pi B^2}{4}}{\frac{V_d}{2} \times \frac{\pi}{180}}\right) \quad [4]$$

First crank angle $\theta_A$ represents a minimum crank angle at which the piston 16 interferes with the valve 12, were the valve 12 to follow the estimated valve profile.

A second crank angle, $\theta_B$, is calculated based upon the first crank angle $\theta_A$, a linear position of the piston determined when the crankshaft is at the first crank angle $\theta_A$, and the estimated valve opening profile (block 112):

$$\theta_B = \theta_A - \frac{P(\theta_A)}{S}, \quad [5]$$

wherein $P(\theta_A)$, comprises the position of piston 16 at crank angle $\theta_A$, and is calculated by substituting $\theta_A$ for θ, in Equation 1, above.

The final crank angle, $\theta_C$, comprising the crank angle at which to begin opening the valve, when it is intake valve 12, is determined by offsetting the second crank angle $\theta_B$ by a safety margin, M (block 114):

$$\theta_C = \theta_B + M \quad [6]$$

Safety margin M is a measure of difference between the estimated valve opening profile and actual valve opening profile. It is preferably determined experimentally, prior to ongoing operation or regular production of the engine, by determining the difference between the estimated valve opening profile and a representative valve and valve actuation system. Safety margin M is preferably developed based upon engine operating speed and load, valve position, and combustion chamber geometry, and operating characteristics of the valve opening mechanism. When the valve opening mechanism is a camshaft with cam lobes, the relevant operating characteristic comprises the cam lobe profile, primarily measured and described in the crank-angle domain, and readily determinable by a skilled practitioner with testing and development. When the valve opening mechanism is a camless system employing an electrically-actuated or electrical/hydraulic actuated device, the relevant operating characteristic comprises the response curve of the device, primarily measured and described in the time domain, and readily determinable by a skilled practitioner with testing and development. Safety margin M may be either a single scalar value, typically when the system mechanization includes a camshaft, or an array of values determined based upon the operating conditions, typically when the system mechanization includes camless actuation of the valves.

Figure 4:
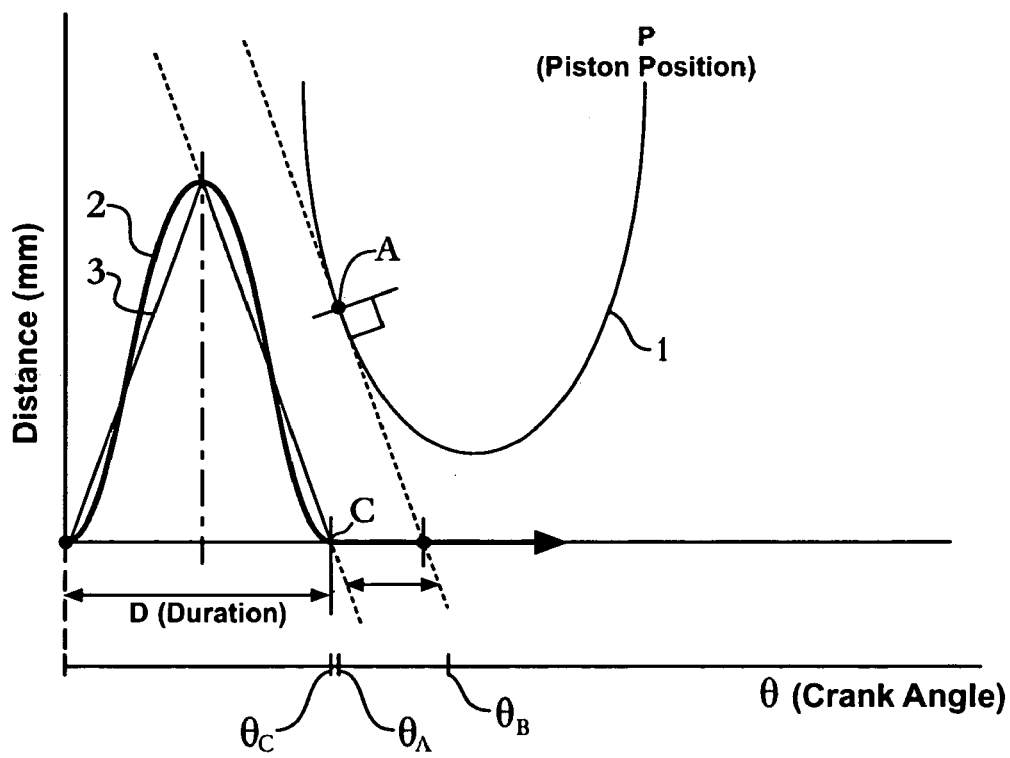
FIG. 4 is a graphical data representation, in accordance with the present invention; and, FIG. 5–FIG. 7 are algorithmic flowcharts, in accordance with the present invention.

Alternatively, and referring now to FIG. 4, when the algorithm is employed to determine a latest crank angle at which to begin opening one of the exhaust valves 14 so all exhaust valves are closed in a timely manner, in order to prevent piston/valve interference, the equation to calculate $\theta_C$ is as follows:

$$\theta_C = \theta_B - M \quad [7]$$

wherein:
$\theta_B$=second crank angle; and
M=safety margin.

Once the valve closing time, $\theta_C$, is determined, the opening time for each exhaust valve can determined by subtracting the valve open duration, D from the valve closing time. With minor modifications, Equations 1–6 can be used to calculate angle $\theta_B$ for an exhaust valve event. However, for best computational efficiency, it is pointed out that FIG. 4 is basically an image reflection of FIG. 3 along the y-axis (where θ=0°, or, top dead center). Therefore, Equations 1–6, above, describing an intake valve event, may be executed to calculate crank angles ($\theta_A$, $\theta_B$, $\theta_C$) for an exhaust valve event. This preferably comprises calculating angles $\theta_A$, $\theta_B$ and $\theta_C$ using Equations 1–6, and negating the resultant values. For example, if θ=10° after top dead center is the earliest opening crank angle calculated using Equations 1–6, then θ=10° before top dead center becomes the latest closing crank angle for each exhaust valve.

Figure 5:
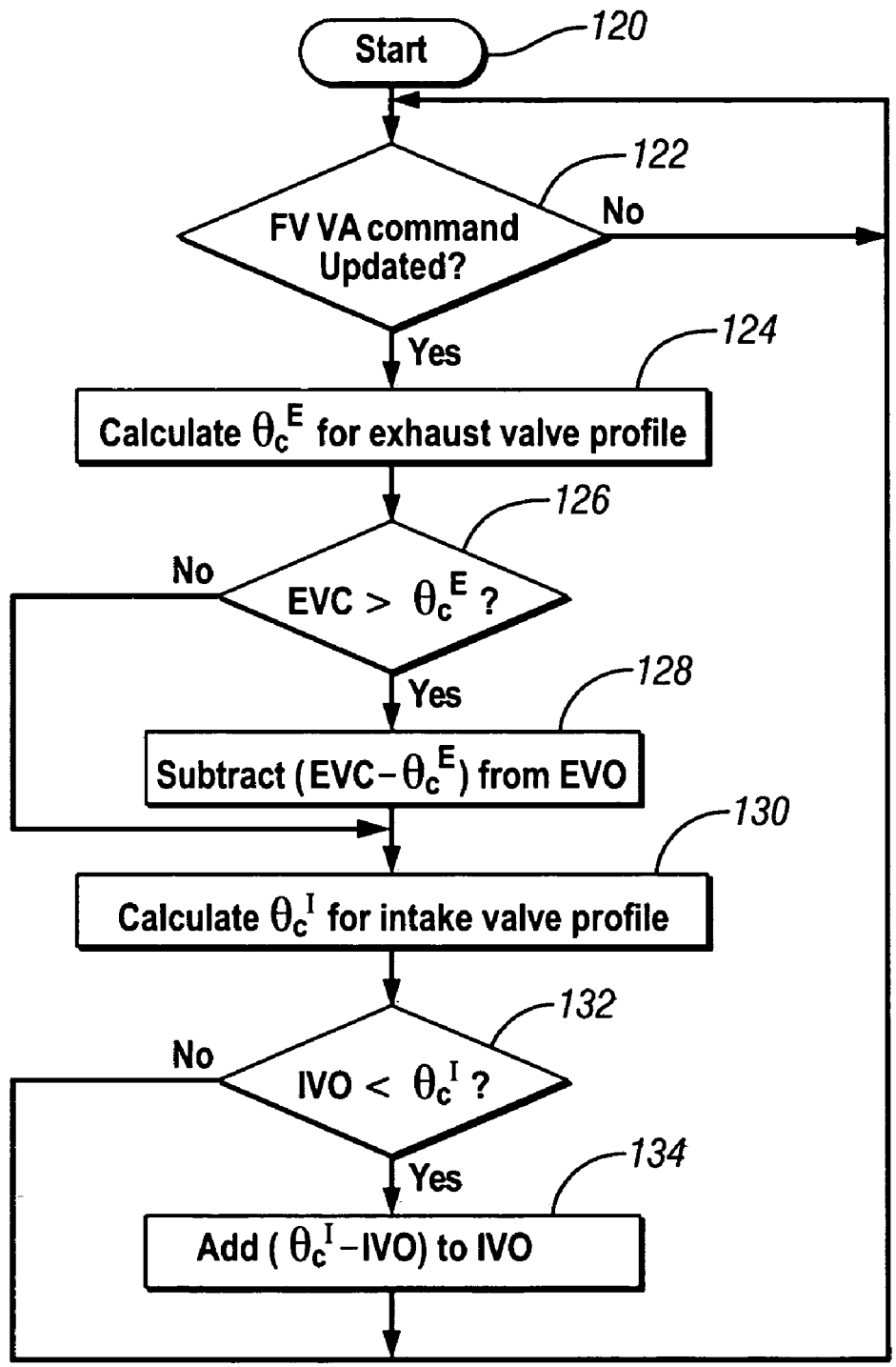

Referring now to FIG. 5, an embodiment of the invention is described, comprising a flowchart for an algorithm to control the valve timing of a variable cam phasing system or an FVVA system, with a given valve profile. Mechanical aspects of the exemplary variable cam phasing system are known, and not described in detail. In the variable cam phasing system, valve lift, L, and duration, D, are fixed by the cam lobe profiles, for both intake and exhaust valves, and the timing of the valve open-time is varied using a known cam phaser. The algorithm confirms that a command to update FVVA control has been received (block 122). In this instance, crank angle $\theta_C^E$, representing the latest closing crank angle for exhaust valve 14 to avoid piston-valve collision is calculated (block 124). The calculations of crank angle $\theta_C^E$ and $\theta_C^I$ have been previously described, hereinabove, with reference to Equations 1 through 7. This crank angle $\theta_C^E$ is compared to exhaust valve closing timing, EVC (block 126). When the commanded exhaust valve closing timing, EVC is greater than crank angle $\theta_C^E$ (in other words, EVC is later than $\theta_C^E$), crank angle $\theta_C^E$ is subtracted from exhaust valve closing timing, EVC, and the result is subtracted from the commanded-exhaust valve opening timing, EVO (block 128). When the exhaust valve closing timing, EVC is not greater than crank angle $\theta_C^E$, the commanded exhaust valve opening timing, EVO is unchanged. Crank angle $\theta_C^I$, representing the earliest opening crank angle for intake valve 12 to avoid piston-valve collision, is calculated (block 130). Crank angle $\theta_C^I$ is compared to intake valve opening timing, IVO (block 132). When the commanded intake valve opening timing, IVO is less than crank angle $\theta_C^I$ (in other words, IVO is earlier than $\theta_C^I$), the commanded intake valve opening timing, IVO, is subtracted from crank angle $\theta_C^I$, and the result is added to the commanded intake valve opening timing, IVO (block 134). When the intake valve opening timing, IVO is not greater than crank angle $\theta_C^I$, the commanded intake valve opening timing, IVO is unchanged.

Figure 6:
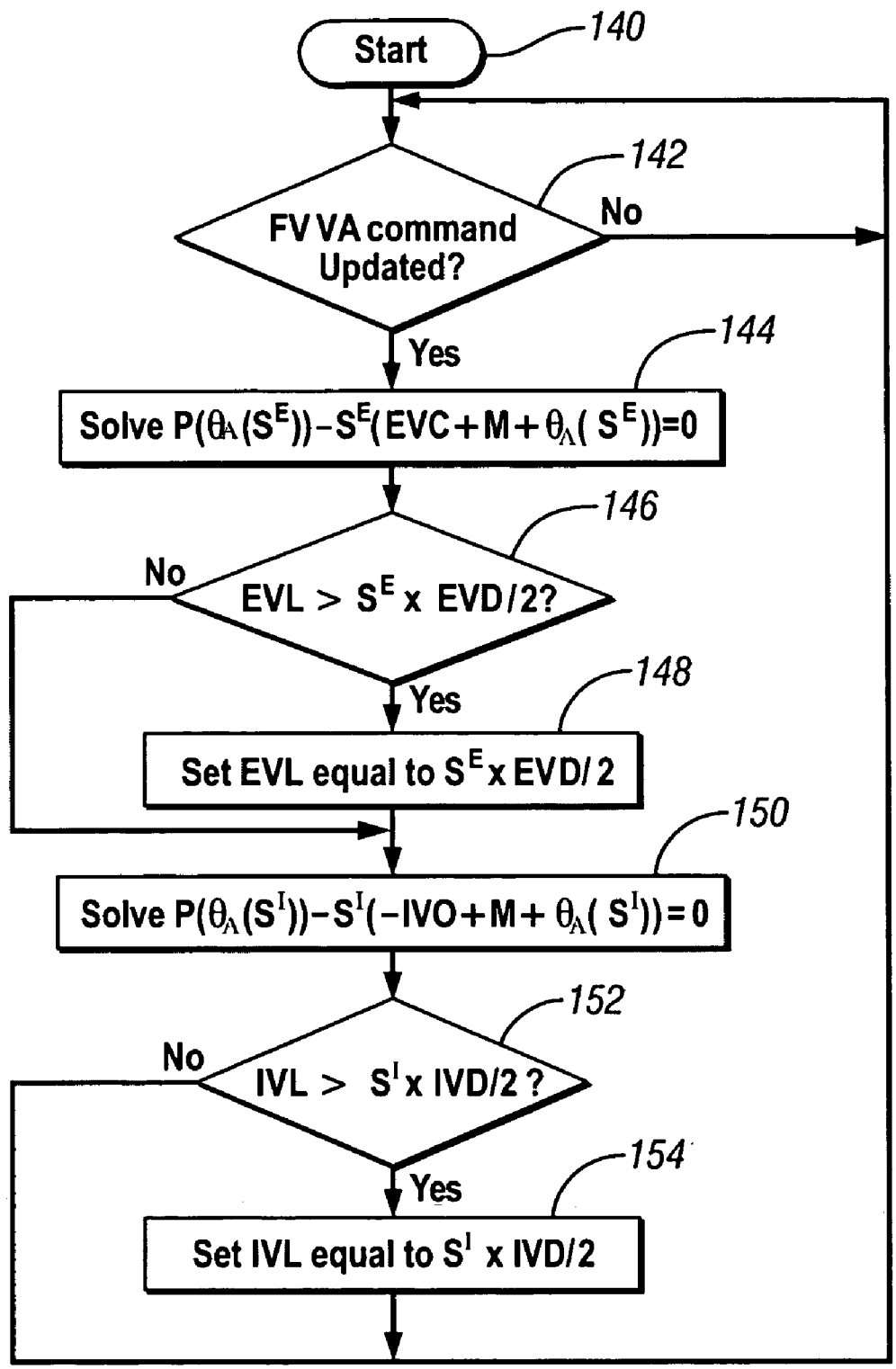

Referring now to FIG. 6, another embodiment of the invention is described, comprising a flowchart for an algorithm to control the valve lift of a variable valve lift control system, or an FVVA system, with a given valve timing and duration. Mechanical aspects of the exemplary variable valve lift control system are known, and not described in detail. In the variable valve lift control system, valve lift, L, is adjusted by changing between two or more cam lobe profiles, for both intake and exhaust valves, and the duration, D, and timing of the valve open-time are fixed. The algorithm confirms that a command to update FVVA control has been received (block 142). The algorithm solves for slope $S^E$, using Equations 1–6 as above, for the exhaust valve 14 (block 144). The resultant slope $S^E$, calculated in Block 144, multiplied by one half of the fixed exhaust valve duration, EVD, becomes the maximum lift, L, allowed to avoid piston-valve collision. The commanded exhaust valve lift, EVL, is compared to the maximum lift $S_E \times EVD/2$ (Block 146). When the commanded exhaust valve lift, EVL, is greater than the maximum lift, the commanded exhaust valve lift, EVL, is set equal to the maximum lift (Block 148). Otherwise, the original exhaust valve lift, EVL, is unchanged. The algorithm solves for slope $S^I$, using Equations 1–6 as above, for the intake valve 12 (block 150). The resultant slope $S^I$, calculated in Block 150, multiplied by one half of the fixed intake valve duration, IVD, is the maximum lift allowed to avoid piston-valve collision. The commanded intake valve lift, IVL, is compared to the maximum lift $S^I \times IVD/2$ (Block 152). When the commanded intake valve lift, IVL, is greater than the maximum lift, the commanded intake valve lift, IVL, is set equal to the maximum lift. Otherwise, the original intake valve lift, IVL, is unchanged.

Figure 7:
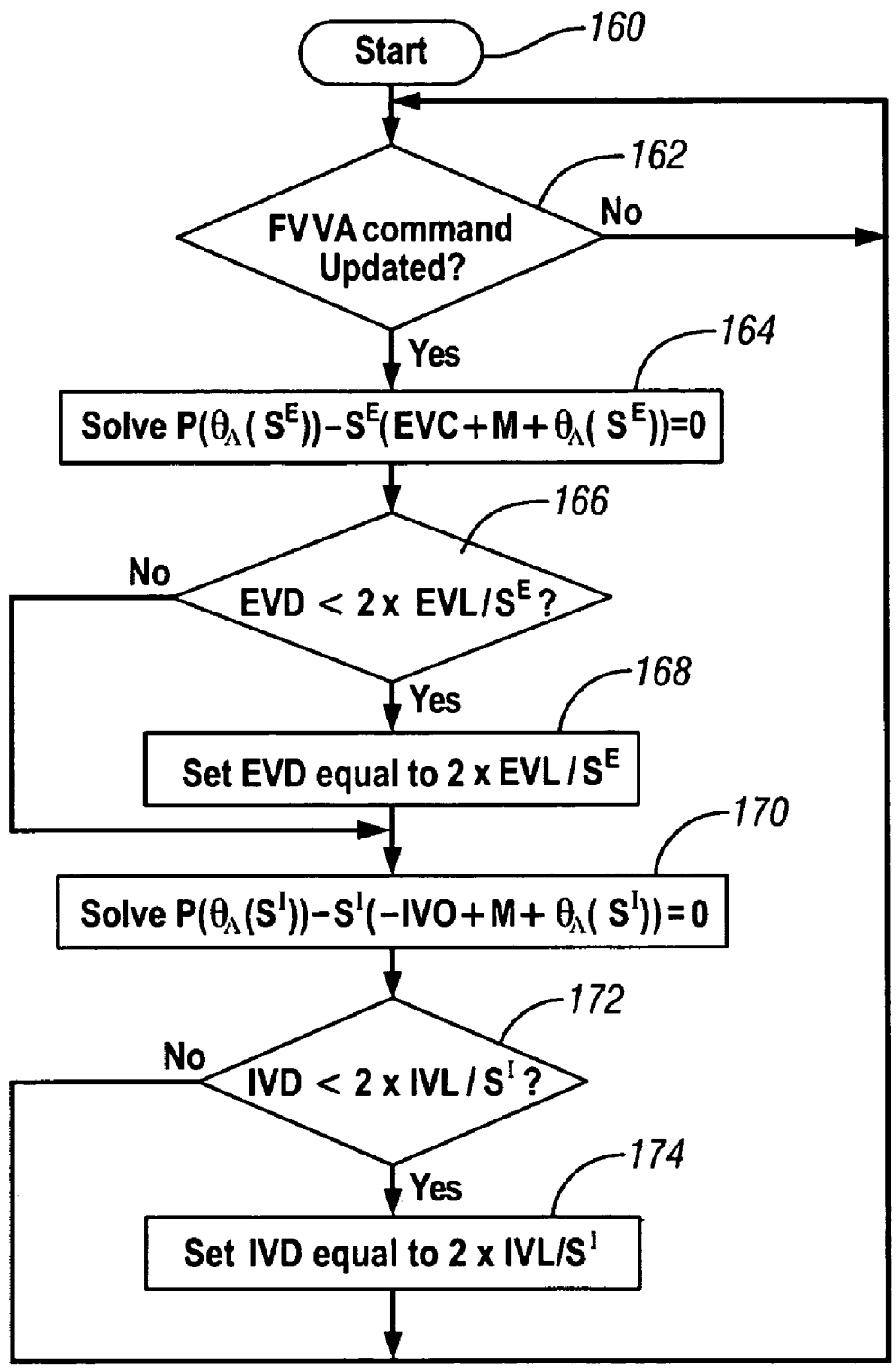

Referring now to FIG. 7, another embodiment of the invention is described, comprising a flowchart for an algorithm to control the valve duration of a variable valve duration control system, or an FVVA system, with a given valve timing and lift. Mechanical aspects of the exemplary variable valve duration control system are known, and not described in detail. In the variable valve duration control system, valve duration, D, is adjusted by changing between two or more cam lobe profiles, for both intake and exhaust valves, and the valve lift, L, and timing of the intake valve opening time and the exhaust valve closing time are fixed. The algorithm confirms that a command to update FVVA control has been received (block 162). The algorithm solves for slope $S^E$, using Equations 1–6 as above, for the exhaust valve 14 (block 164). The minimum exhaust valve open duration ($2 \times EVL/S^E$) to avoid piston-valve collision is calculated from the resultant slope $S^E$, calculated in Block 164, and the fixed exhaust valve lift, EVL. The commanded exhaust valve open duration, EVD, is compared to the minimum exhaust valve open duration (Block 166). When the commanded exhaust valve duration, EVD, is less than the minimum exhaust valve duration, the commanded exhaust valve duration, EVD, is set equal to the minimum exhaust valve duration $2 \times EVL/S^E$ (Block 168). Otherwise, the commanded exhaust valve duration, EVD, is unchanged. The algorithm solves for slope $S^I$, using Equations 1–6 as above, for the intake valve 12 (block 170). The minimum intake valve duration ($2 \times IVL/S^I$) to avoid piston-valve collision is calculated from the resultant slope, $S^I$, calculated in Block 170, and the fixed intake valve lift, IVL. The commanded intake valve duration, IVD, is compared to the minimum intake valve duration (Block 172). When the commanded intake valve duration, IVD, is less than the minimum intake valve duration, the commanded intake valve duration, IVD, is set equal to the minimum intake valve duration, $2 \times IVL/S^I$ (Block 172). Otherwise, the commanded intake valve duration, IVD, is unchanged.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to determine a crank angle at which to initiate engine valve opening into a cylinder having a reciprocating piston, said piston attached to a rotating crankshaft, comprising:
   determining a desired valve lift, and, a duration of valve open time;
   estimating an opening profile for the engine valve, based upon the desired valve lift, and, the duration of valve open time;
   determining a first crank angle, based upon the estimated opening profile for the engine valve, a cylinder diameter, and, a cylinder displacement;
   determining a second crank angle, based upon the first crank angle, a linear position of the piston determined when the crankshaft is at the first crank angle, and, the estimated opening profile for the engine valve; and,
   offsetting the second crank angle by a safety margin.

2. The method of claim 1, wherein estimating the opening profile for the engine valve, based upon the desired valve lift, and the duration of valve open time, comprises: estimating position of the valve over a range from a closed position to a fully open position as a linear equation with a fixed-slope over the range from the closed position to the fully open position.

3. The method of claim 2, wherein offsetting the second crank angle by the safety margin comprises: determining a difference between the estimated valve opening profile and actual valve opening profile.

4. The method of claim 3, wherein determining a difference between the estimated valve opening profile and actual valve opening profile comprises: determining the difference between the estimated valve opening profile and actual valve opening profile, based upon engine operation, and, valve actuation mechanization.

5. The method of claim 1, further comprising: controlling a position of a variable cam phasing device, based upon the determined crank angle at which to initiate engine valve opening.

6. The method of claim 1, further comprising: executing the method to regularly determine crank angle at which to initiate engine valve opening at least once per engine cycle.

7. The method of claim 1, further comprising: executing the method to regularly determine crank angle at which to initiate engine valve opening at least once per valve event.

8. Method to control actuation of an engine valve operable to control combustion chamber flow, said combustion chamber formed in a cylinder having a reciprocating piston operably attached to a crankshaft, comprising:
determining a crank angle at which to initiate engine valve opening, comprising:
determining a desired valve lift, and a duration of valve open time;
estimating an opening profile for the engine valve, based upon the desired valve lift, and, the duration of valve open time;
determining a first crank angle, based upon the estimated opening profile for the engine valve, a cylinder diameter, and, a cylinder displacement;
determining a second crank angle, based upon the first crank angle, a linear position of the piston determined when the crankshaft is at the first crank angle, and, the estimated opening profile for the engine valve; and,
offsetting the second crank angle by a safety margin.

9. The method of claim 8, wherein estimating the opening profile for the engine valve, based upon the desired valve lift, and the duration of valve open time, comprises: estimating position of the valve over a range from a closed position to a fully open position as a linear equation with a fixed-slope over the range from the closed position to the fully open position.

10. The method of claim 8, wherein offsetting the second crank angle by the safety margin comprises: determining a difference between the estimated valve opening profile and actual valve opening profile.

11. The method of claim 9, comprising: determining the desired valve lift based upon a predetermined crank angle at which to initiate engine valve opening and a predetermined duration of valve open time.

12. The method of claim 9, comprising: determining the duration of valve open time based upon a predetermined crank angle at which to initiate engine valve opening and a predetermined desired valve lift.

13. System to control actuation of an engine valve operable to control combustion chamber flow, comprising:
an internal combustion engine: comprising a plurality of cylinders; each cylinder having a head, including at least one air intake valve and at least one exhaust valve; and, a reciprocating piston; each piston operably connected to a rotating crankshaft; a crank position sensor; a valve actuation system; and,
a controller, signally electrically connected to the crank position sensor, and, operably connected to the valve actuation system;
the controller operable to determine a crank angle at which to initiate engine valve opening, comprising:
determine a desired valve lift, and a duration of valve open time,
estimate an opening profile for the engine valve, based upon the desired valve lift, and, the duration of valve open time,
determine a first crank angle, based upon the estimated opening profile for the engine valve, and, the duration of valve open time,
determine a second crank angle, based upon the first crank angle, a linear position of the piston determined when the crankshaft is at the first crank angle, and, the estimated opening profile for the engine valve, and,
offset the second crank angle by a safety margin; and,
the controller operable to control the valve actuation system based upon the determined crank angle at which to initiate engine valve opening.

14. The system of claim 13, wherein the controller operable to control the valve actuation system based upon the determined crank angle at which to initiate engine valve opening comprises the controller operable to control the at least one intake valve based upon the determined crank angle at which to initiate engine valve opening.

15. The system of claim 13, wherein the controller operable to control the valve actuation system based upon the determined crank angle at which to initiate engine valve opening comprises the controller operable to control the at least one exhaust valve based upon the determined crank angle at which to initiate engine valve opening.

16. The system of claim 13, wherein the valve actuation system comprises a variable cam phasing system.

17. The system of claim 13, wherein the valve actuation system comprises a variable valve lift control system.

18. The system of claim 13, wherein the valve actuation system comprises a multiple step valve lift system.

19. The system of claim 13, wherein the valve actuation system comprises an individually actuated valve control system.

20. The system of claim 13, wherein the valve actuation system comprises a variable valve duration control system.

21. The system of claim 13, wherein the valve actuation system comprises a fully flexible variable valve actuation system.

22. The system of claim 13, wherein the controller operable to determine a crank angle at which to initiate engine valve opening comprises: the controller operable to determine the crank angle at which to initiate engine valve opening once per engine cycle.

23. The system of claim 13, wherein the controller operable to determine a crank angle at which to initiate engine valve opening comprises: the controller operable to determine the crank angle at which to initiate engine valve opening once per valve opening event.

* * * * *